United States Patent
Schenkel

(10) Patent No.: US 6,776,869 B1
(45) Date of Patent: Aug. 17, 2004

(54) IMPACT-RESISTANT EPOXIDE RESIN COMPOSITIONS

(75) Inventor: Hubert Schenkel, Sandhausen (DE)

(73) Assignee: Henkel-Teroson GmbH, Heidelberg (DE)

(*) Notice: Subject to any disclaimer, the term of this patent is extended or adjusted under 35 U.S.C. 154(b) by 0 days.

(21) Appl. No.: 09/868,566

(22) PCT Filed: Dec. 10, 1999

(86) PCT No.: PCT/EP99/09732

§ 371 (c)(1),
(2), (4) Date: Nov. 7, 2001

(87) PCT Pub. No.: WO00/37554

PCT Pub. Date: Jun. 29, 2000

(30) Foreign Application Priority Data

Dec. 19, 1998 (DE) .......................... 198 58 921

(51) Int. Cl.$^7$ ............................................. C09J 201/02
(52) U.S. Cl. ................... 156/331.7; 156/330; 523/466; 525/130; 525/528; 525/529
(58) Field of Search .............................. 156/330, 331.7; 523/466; 525/130, 528, 529

(56) References Cited

U.S. PATENT DOCUMENTS

| 5,073,601 A | 12/1991 | Muelhaupt et al. ......... 525/109 |
| 5,084,532 A | 1/1992 | Schenkel .................. 525/524 |
| 5,202,390 A | 4/1993 | Muelhaupt et al. ......... 525/426 |
| 5,278,257 A | 1/1994 | Mulhaupt et al. ........... 525/454 |
| 5,290,857 A | 3/1994 | Ashida et al. ................ 525/65 |
| 5,686,509 A | 11/1997 | Nakayama et al. ......... 523/201 |
| 5,789,482 A | 8/1998 | Eldin et al. .................... 525/65 |
| 6,015,865 A | 1/2000 | Blank et al. ................ 525/524 |

FOREIGN PATENT DOCUMENTS

| CA | 1334700 | 3/1995 |
| EP | 0 308 664 | 3/1989 |
| EP | 0 338 985 | 10/1989 |
| EP | 0 354 498 | 2/1990 |
| EP | 0 449 776 | 10/1991 |
| EP | 0 591 307 | 4/1994 |
| EP | 0 353 190 | 3/1995 |
| EP | 0 343 676 | 5/1995 |

OTHER PUBLICATIONS

Kotting et al., Anforderungen AN Klebstoffe Fuer Strukturverbindugen IM Karosseriebua, No. 9, pp. 19–26, Adheison (1988).

*Primary Examiner*—Philip Tucker
*Assistant Examiner*—D. Aylward
(74) *Attorney, Agent, or Firm*—Stephen D. Harper

(57) ABSTRACT

A high strength adhesive having a good impact strength at low temperatures, below 0° C., and at temperatures of 90° C. is provided. The adhesive comprises a copolymer having at least one glass transition temperature of –30° C. or lower having epoxy reactive end groups or a reaction product of the copolymer with a polyepoxide, a reaction product of a polyurethane prepolymer and a polyphenol or polyaminophenol and at least one epoxy resin.

18 Claims, No Drawings

IMPACT-RESISTANT EPOXIDE RESIN COMPOSITIONS

CROSS REFERENCE TO RELATED APPLICATIONS

This application is a national stage application under 35 U.S.C. § 371 of international application PCT/EP99/09732 filed on Dec. 10, 1999, the international application not being published in English. This application also claims priority under 35 U.S.C. § 119 to DE 198 58 921.2 filed on Dec. 19, 1998.

FIELD OF THE INVENTION

This invention relates to the use of mixtures of special diene copolymers and phenol-terminated polyurethanes or polyureas or polyimides in admixture with epoxy resins and/or adducts of epoxy resins with diene copolymers and/or the polyurethane or the polyurea as high-impact epoxy resin adhesives with particularly good low-temperature properties and to reactive, preferably one-component hotmelt adhesives with good low-temperature impact strength.

BACKGROUND OF THE INVENTION

Reactive epoxy-based hotmelt adhesives are known. In machine and vehicle construction and especially in the construction of aircraft, railway vehicles and motor vehicles, components of various metals and/or composite materials are increasingly being joined together with the aid of adhesives. Epoxy adhesives are widely used for high-strength structural bonding, more particularly as heat-curing one-component adhesives which, in many cases, are also formulated as reactive hotmelts. Reactive hotmelts are adhesives which are solid at room temperature and which soften and behave like a thermoplastic material at temperatures of up to about 80 to 90° C. It is only at relatively high temperatures of about 100° C. and higher that the latent hardeners present in these hotmelt adhesives are thermally activated so that irreversible curing to a thermoset occurs. To join the components together, for example in the vehicle industry, the adhesive is first applied warm to at least one substrate surface, after which the parts to be joined are then fitted together. The adhesive then solidifies on cooling and, through this physical solidification, establishes adequate handling resistance, i.e. a temporary bond. The parts thus joined together are further treated in various washing, phosphating and dip painting baths. It is only after this that the adhesive is cured at relatively high temperatures in an oven.

Conventional adhesives and hotmelt adhesives based on epoxy resins are hard and brittle in the cured state. Although the bonds obtained with them are generally characterized by very high tensile shear strength, the adhesives flake off under peel, impact or impact/peel stress, particularly at relatively low temperatures, so that loss of bond strength readily occurs when the adhesive joint is subjected to that kind of stress. Accordingly, numerous proposals have already been put forward with a view to so modifying epoxy resins by flexible additives that their brittleness is clearly reduced. One known process is based on the use of special rubber/epoxy resin adducts which are incorporated as heterodisperse phase in the epoxy resin matrix so that the epoxies become more impact-resistant. These epoxy resin compositions are also referred to as "toughened". Another known modification of epoxy resins of the above-mentioned type consists in the reaction of a carboxyl-terminated polybutadiene-co-acrylonitrile copolymer with an epoxy resin. This rubber/epoxy adduct is then dispersed in one or more different epoxy resins. The reaction of the epoxy resin with the carboxyl-containing butadiene/acrylonitrile rubber has to be conducted in such a way that the adduct is not prematurely cured. Although correspondingly modified epoxy resin compositions already represent a clear improvement over unmodified epoxy resins in relation to their impact strength, their behaviour under peel or impact/peel stress is still not satisfactory.

EP-A-0 343 676 describes adhesive compositions made up of a mixture of several epoxy resins, a phenolic resin and a polyurethane/epoxy adduct. The polyurethane/epoxy adduct present therein consists of a reaction product of several polyalkylene glycol homopolymers and copolymers containing primary and secondary OH groups, a diisocyanate and at least one epoxy resin. According to the document in question, these hotmelt adhesive compositions show improved shear resistance, peel strength and impact strength in relation to various commercial one-component hotmelt adhesive compositions. Unfortunately, there is no reference to the adhesive properties of the cured adhesive joint at low temperatures.

U.S. Pat. No. 5,290,857 describes an epoxy resin adhesive composition containing an epoxy resin and a powder-form core/shell polymer and a heat-activatable hardener for the epoxy resin. The powder-form core/shell polymer is composed of a core containing an acrylate or methacrylate copolymer with a glass transition temperature of −30° C. or lower and a shell containing an acrylate or methacrylate polymer which contains crosslinking monomer units and which has a glass transition temperature of 70° C. or higher, the ratio by weight of the core to the shell being between 10:1 and 1:4. These compositions are said to have excellent adhesive properties, such as peel strength, tensile shear strength and T-peel strength, and also good partial gellability. No mention is made of the properties of bonds with these adhesives at low temperatures.

Similarly, U.S. Pat. No. 5,686,509 describes an adhesion-strengthening composition for epoxy resins consisting of powder-form copolymer particles ionically crosslinked with a mono- or divalent metal cation. The core of the core/shell polymer is composed of a diene monomer and optionally crosslinking monomer units and has a glass transition temperature of −30° C. or lower. The shell copolymer has a glass transition temperature of at least 70° C. and is made up of acrylate or methacrylate monomer units and radically polymerizable unsaturated carboxylic acid units. The adhesive composition is said to contain 15 to 60 parts of by weight of the adhesion-strengthening copolymer powder and 3 to 30 parts by weight of a heat-activatable hardening agent to 100 parts of epoxy resin. These compositions are recommended for use as structural adhesives for automobile parts. No mention is made of the low temperature properties of corresponding bonds.

EP-A-0 308 664 describes epoxy resin compositions which contain an epoxide adduct of a carboxyl-containing copolymer based on butadiene/acrylonitrile or similar butadiene copolymers and a reaction product of an elastomeric isocyanate-terminated prepolymer soluble or dispersible in epoxy resins with a polyphenol or aminophenol and subsequent reaction of this adduct with an epoxy resin. In addition, these compositions may contain one or more epoxy resins. Furthermore, aminofunctional hardeners, polyaminoamides, polyphenols, polycarboxylic acids and their anhydrides or catalytic hardeners and optionally accelerators are proposed for hardening these compositions. The compositions in question are said to be suitable as adhesives which can have high strength, a high glass transition temperature, high peel strength, high impact strength or high tear propagation resistance according to their particular composition.

EP-A-0 308 664 does not indicate whether the compositions described therein are suitable for adhesives with good low-temperature impact strength.

Similarly, EP-A-0 353 190 describes epoxy resin compositions containing an adduct of an epoxy resin and a carboxylated butadiene/acrylonitrile copolymer and a reaction product of a hydroxyl-, mercapto- or amino-terminated polyalkylene glycol with a phenol carboxylic acid with subsequent reaction of the phenolic group with an epoxy resin. According to EP-A-0 353 190, these compositions are suitable for the production of adhesives, adhesive films, patches, sealing compounds, paints or matrix resins. There is no indication of whether the adhesives thus produced have good low-temperature impact strength.

According to the teaching of EP-A-0 354 498 or EP-A-0 591 307, reactive hotmelt adhesive compositions can be produced from a resin component, at least one heat-activatable latent hardener for the resin component and optionally accelerators, fillers, thixotropicizing agents and other typical additives, the resin component being obtainable by the reaction of an epoxy resin solid at room temperature and an epoxy resin liquid at room temperature with one or more linear or branched amino-terminated polyoxypropylenes. The epoxy resins are said to be used in such a quantity, based on the amino-terminated polyoxypropylene, that an excess of epoxy groups, based on the amino groups, is guaranteed. These adhesive compositions have a high peel resistance in the T-peel test which they retain even at low temperatures.

The problem addressed by the present invention was further to improve reactive adhesives of the type mentioned at the beginning to the extent that they would have adequate flexibility and increased peel strength not only at room temperature but also—and in particular—at low temperatures (below 0° C.). In particular, they would show high peel strength at low temperatures and under impact so that, even in the event of a crash, structurally bonded parts would meet modern safety standards in vehicle construction. These improvements would be obtained without any deterioration in peel strength at high temperatures or in tensile shear strength. In addition, the reactive adhesives would have to exhibit adequate wash-out resistance immediately after application and before final curing. To that end, the adhesive compositions would have to lend themselves as hotmelts to formulation as a highly viscous adhesive suitable for warm application. Another possibility would be to formulate the compositions as an adhesive that could be gelled by a thermal preliminary reaction in a so-called "white body oven" or by induction heating of the joined parts.

BRIEF DESCRIPTION OF THE INVENTION

The solution provided by the invention to the problem as stated above is defined in the claims and consists essentially in the use of compositions which contain A) a copolymer having at least one glass transition temperature of –30° C. or lower and epoxy-reactive groups,
B) a reaction product of a polyurethane prepolymer and a polyphenol or aminophenol and
C) at least one epoxy resin as structural adhesives with good low-temperature impact strength.

DETAILED DESCRIPTION OF THE INVENTION

A structural adhesive in the context of the invention is an adhesive which has a tensile shear strength of 15 MPa at room temperature on steel and which still guarantees a tensile shear strength on steel of more than 10 MPa at an elevated temperature of 90° C. Such an adhesive has good low-temperature impact strength when the impact peel energy at 2 m/sec to ISO 11343 at –20° C. is at least 5 J.

Components A), B) and C) may also be mixtures of compounds of the type mentioned. Components A) and B) are preferably reacted with a large stoichiometric excess of epoxy resins in separate reactions and then optionally mixed with other epoxy resins, heat-activatable hardeners and/or other additives.

Examples of the copolymers of component A) are 1,3-diene polymers containing carboxyl groups and the other polar ethylenically unsaturated comonomers. The diene may be butadiene, isoprene or chloroprene and is preferably butadiene. Examples of polar ethylenically unsaturated comonomers are acrylic acid, methacrylic acid, lower alkyl esters of acrylic or methacrylic acid, for example methyl or ethyl esters thereof, amides of acrylic or methacrylic acid, fumaric acid, itaconic acid, maleic acid or lower alkyl esters or semiesters thereof or maleic acid or itaconic anhydride, vinyl esters, such as for example vinyl acetate or—more particularly—acrylonitrile or methacrylonitrile. Most particularly preferred copolymers A) are carboxyl-terminated butadiene/acrylonitrile copolymers (CTBN) which are commercially available in liquid form under the name of Hycar from B.F. Goodrich. These copolymers have molecular weights of 2,000 to 5,000 and acrylonitrile contents of 10% to 30%. Actual examples are Hycar CTBN 1300×8, 1300×13 or 1300×15.

The core/shell polymers known from U.S. Pat. No. 5,290,857 and from U.S. Pat. No. 5,686,509 may also be used as component A). The core monomers should have a glass transition temperature of or below –30° C. and may be selected from the group of diene monomers as mentioned above or suitable acrylate or methacrylate monomers. The core polymer may optionally contain crosslinking monomer units in small quantities. The shell is made up of copolymers which have a glass transition temperature of at least 60° C. The shell is preferably made up of lower alkyl acrylate or methacrylate monomer units (methyl or ethyl esters) and polar monomers, such as (meth)acrylonitrile, (meth)acrylamide, styrene or radical-polymerizable unsaturated carboxylic acids or carboxylic anhydrides.

However, the adducts of epoxy resins and the liquid CTBN rubbers mentioned above are particularly preferred for component A).

Component B) may be represented by the following formula I:

in which m=1 or 2, n=2 or 3, $R^1$ is a residue of a polyalkylene glycol after removal of the functional groups (hydroxyl or amino groups).

$R^2=C_{6-14}$ alkyl, aryl, aralkyl (residue of a diisocyanate after removal of the isocyanate groups).

X, Y= —O—, —S— or —NR$^4$—, where $R^4$=H or $C_{1-4}$ alkyl or phenyl, $R^3$ is a carbocyclic-aromatic or araliphatic m+1-functional residue with groups Z directly attached to the aromatic ring and Z= —OH or —NHR$^4$ (residue of a polyphenol or aminophenol after removal of the functional groups).

Component B) is a reaction product of a di- or polyamine or di- or polyol and a diisocyanate. The stoichiometric ratio between amino groups or hydroxyl groups and isocyanate groups is selected so that the isocyanate groups are present in a stoichiometric excess, preferably of 1.5 to 2, over the amino groups or hydroxy groups. The isocyanate-terminated polyurethane prepolymer thus formed is then reacted with an excess of polyphenol or aminophenol so that the reaction product bears terminal phenolic or amino groups. Polyester polyols may also be mixed into this reaction mixture. The reaction mixture thus formed is generally reacted directly with the other constituents of the composition, such as component A) and other epoxy resins, although it may also be reacted with a large stoichiometric excess of epoxy resins so that an epoxy-terminated addition product is formed.

In principle, a large number of polyurethane prepolymers may be used for the addition of the poly- or aminophenols although hydroxy-terminated or amino-terminated polyalkylene glycols, more particularly di- or trifunctional hydroxy-terminated or amino-terminated polypropylene glycols, polyethylene glycols or copolymers of propylene glycol and ethylene glycol, and in particular polytetramethylene glycols (poly-THF) are preferably used. Other suitable synthesis components for the polyurethane prepolymers are amino-terminated or hydroxy-terminated polybutadienes. The hydroxy- or amino-terminated polyalkylene glycols and the corresponding polybutadiene derivatives have molecular weights of 400 to 5,000.

In principle, suitable di- or polyisocyanates for the production of the polyurethane prepolymers are any aromatic, aliphatic or cycloaliphatic polyisocyanates known in polyurethane chemistry.

Examples of suitable aromatic polyisocyanates are any isomers of toluene diisocyanate (TDI) either in pure isomer form or in the form of a mixture of several isomers, naphthalene-1,5-diisocyanate, diphenylmethane-4,4'-diisocyanate (MDI), diphenylmethane-2,4'-diisocyanate and mixtures of 4,4'-diphenylmethane diisocyanate with the 2,4' isomer or mixtures thereof with oligomers of relatively high functionality (so-called crude MDI). Examples of suitable cycloaliphatic polyisocyanates are the hydrogenation products of the above-mentioned aromatic diisocyanates such as, for example, 4,4'-dicyclohexylmethane diisocyanate ($H_{12}MDI$), 1-isocyanatomethyl-3-isocyanato-1,5,5-trimethyl cyclohexane (isophorone diisocyanate, IPDI), cyclohexane-1,4-diisocyanate, hydrogenated xylylene diisocyanate ($H_6XD$), m- or p-tetramethyl xylylene diisocyanate (m-TMXDI, p-TMXDI) and dimer fatty acid diisocyanate. Examples of aliphatic polyisocyanates are hexane-1,6-diisocyanate (HDI), 1,6-diisocyanate-2,2,4-trimethyl hexane, butane-1,4-diisocyanate and 1,12-dodecane diisocyanate ($C_{12}DI$). The aliphatic, cycloaliphatic or even araliphatic diisocyanates are particularly preferred.

The polyphenols or aminophenols to be used for reaction product B) are either aromatic di- or trihydroxy compounds derived from a mono- or polynuclear carbocyclic-aromatic radical or the corresponding aminohydroxy compounds. The aromatic rings may either be condensed or attached to one another by binding links or by a covalent bond.

Examples of the compounds mentioned first are hydroquinone, resorcinol, pyrocatechol, isomers of dihydroxynaphthalene (pure isomers or a mixture of several isomers), isomers of dihydroxyanthracene and the corresponding aminohydroxy compounds. The polyphenols or aminophenols, which are derived from carbocyclic-aromatic compounds of which the aromatic nucleic are attached by binding links, may be represented by the following general formula II:

Z—AR—B—AR—Z  (II)

in which Z is as defined above,

AR is a mononuclear aromatic radical which may optionally be further substituted by alkyl or alkenyl radicals,
B stands for the binding link which may be selected from the group consisting of a covalent bond, —$CR^5R^6$—, —O—, —S—, —$SO_2$—, —CO—, —COO—, —$CONR^7$— and $SiR^8R^9$— where $R^5$, $R^6$ and $R^7$ independently of one another represent hydrogen, —$CF_3$ or $C_{1-6}$ alkyl or $R^5$ and $R^6$ together with the common C atom form a cycloaliphatic radical with 5 to 7 ring C atoms, $R^8$ and $R^9$ represent $C_{1-6}$ alkyl. The two groups B and Z in formula II independently of one another may be located in the ortho, meta or para position. Particularly preferred compounds corresponding to formula II are 4,4'-dihydroxydiphenyl or the bisphenols A and/or F.

The polyester polyols optionally present in component B) are the polyester polyols known per se which are used in polyurethane chemistry, for example for the production of hotmelt adhesives.

Examples of such polyester polyols are reaction products of discarboxylic acids, such as glutaric acid, adipic acid, sebacic acid, suberic acid, 3,3-dimethylglutaric acid, terephthalic acid, isophthalic acid, dimer fatty acid, with low molecular weight dihydric alcohols such as, for example, ethylene glycol, propylene glycol, butane-1,4-diol, diethylene glycol, triethylene glycol or dimer fatty alcohol. Suitable polyester polyols may optionally be lightly branched, i.e. small quantities of a tricarboxylic acid or trihydric alcohol were used for their production.

Suitable epoxy resins for component C) or for forming the epoxy adduct or for mixing components A) and B) are any of a number of polyepoxides which contain at least two 1,2-epoxy groups per molecule. The epoxy equivalent of these polyepoxides may be between 150 and 4,000. Basically, the polyepoxides may be saturated, unsaturated, cyclic or acyclic, aliphatic, alicyclic, aromatic or heterocyclic polyepoxide compounds. Examples of suitable polyepoxides include the polyglycidyl ethers which are obtained by reaction of epichlorohydrin or epibromohydrin with a polyphenol in the presence of alkali. Polyphenols suitable for this purpose are, for example, resorcinol, pyrocatechol, hydroquinone, bisphenol A (bis-(4-hydroxyphenyl)-2,2-propane)), bisphenol F (bis(4-hydroxyphenyl)methane), bis-(4-hydroxyphenyl)1,1-isobutane, 4,4'-dihydroxybenzophenone, bis-(4-hydroxyphenyl)-1,1-ethane, 1,5-hydroxynaphthalene.

Other polyepoxides suitable in principle are the polyglycidyl ethers of polyalcohols or diamines. These polyglycidyl ethers are derived from polyalcohols, such as ethylene glycol, diethylene glycol, triethylene glycol, 1,2-propylene glycol, 1,4-butylene glycol, triethylene glycol, pentane-1,5-diol, hexane-1,6-diol or trimethylol propane.

Other polyepoxides are polyglycidyl esters of polycarboxylic acids, for example reaction products of glycidol or epichlorohydrin with aliphatic or aromatic polycarboxylic acids, such as oxalic acid, succinic acid, glutaric acid, terephthalic acid or dimer fatty acid.

Other epoxides are derived from the epoxidation products of olefinically unsaturated cycloaliphatic compounds or from native oils and fats.

The epoxy resins obtained by reaction of bisphenol A or bisphenol F and epichlorohydrin are most particularly preferred. Mixtures of liquid and solid epoxy resins are generally used, the liquid epoxy resins preferably being based on bisphenol A and having a sufficiently low molecular weight. Epoxy resins liquid at room temperature which generally have an epoxy equivalent weight of 150 to about 220 and more particularly in the range from 182 to 192 are particularly preferred for the adduct formation of components A) and B).

The hardness of the reactive adhesive in the cooled state, i.e. in particular after application to the substrate to be joined, but before curing, depends on the degree of condensation and hence molecular weight of component B) in particular and on the ratio of solid epoxy resin to liquid epoxy resin. The higher the degree of condensation (and hence the molecular weight) of condensation product B) and the greater the proportion of slid epoxy resin in the composition, the harder the cooled semicrystalline adhesive will be.

Suitable heat-activatable or latent hardeners for the epoxy resin binder system of components A), B) and C) are guanidines, substituted guanidines, substituted ureas, melamine resins, guanadine derivatives, cyclic tertiary amines, aromatic amines and/or mixtures thereof. The hardeners may be stoichiometrically included in the curing reaction although they may also be catalytically active. Examples of substituted guanidines are methyl guanidine, dimethyl guanidine, trimethyl guanidine, tetramethyl guanidine, methyl isobiguanidine, dimethyl isobiguanidine, tetramethyl isobiguanidine, hexamethyl isobiguanidine, heptamethyl isobiguanidine and, most particularly, cyanoguanidine (dicyanodiamide). Alkylated benzoguanamine resins, benzoguanamine resins or methoxymethyl ethoxymethyl benzoguanamine are mentioned as representatives of suitable guanamine derivatives. The selection criterion for the one-component heat-curing hotmelt adhesives is of course their low solubility at room temperature in the resin system so that solid finely ground hardeners are preferred, dicyanodiamide being particularly suitable. The composition is thus guaranteed a long shelf life.

Catalytically active substituted ureas may be used in addition to or instead of the hardeners mentioned above. These substituted ureas are, in particular, p-chlorophenyl-N,N-dimethyl urea (Monuron), 3-phenyl-1,1-dimethyl urea (Fenuron) or 3,4-dichlorophenyl-N,N-dimethyl urea (Diuron). In principle, catalytically active tertiary aryl or alkyl amines, for example benzyl dimethyl amine, tris (dimethylamino)phenol, piperidine or piperidine derivatives, may also be used, but often have too high a solubility in the adhesive system so that the one-component system is not guaranteed useful shelf life in their case. In addition, various, preferably solid imidazole derivatives may be used as catalytically active accelerators. 2-Ethyl-2-methyl imidazole, N-butyl imidazole, benzimidazole and N-$C_{1-12}$-alkyl imidazoles or N-arylimidazoles are mentioned as representatives of such accelerators.

In addition, the adhesives according to the invention contain fillers known per se such as, for example, the various ground or precipitated chalks, carbon black, calcium magnesium carbonates, heavy spar and, in particular, silicate fillers of the aluminum-magnesium-calcium silicate type, for example wollastonite, chlorite.

The adhesive compositions according to the invention may also contain other typical auxiliaries and additives such as, for example, plasticizers, reactive diluents, rheology aids, wetting agents, antiagers, stabilizers and/or pigments.

The adhesives according to the invention may be formulated on the one hand as one-component adhesives which in turn may be formulated both as highly viscous adhesives designed for warm application and as heat-activatable hotmelt adhesives. These adhesives may also be formulated as one-component pregellable adhesives, in which case the compositions contain either fine-particle thermoplastic powders such as, for example, polymethacrylates, polyvinyl butyral or other thermoplastic (co)polymers or the curing system is so adapted that a two-stage curing process occurs, the gelling step effecting only partial curing of the adhesive and final curing in vehicle construction taking place, for example, in one of the paint ovens, preferably the cathodic electrodeposition oven.

The adhesive compositions according to the invention may also be formulated as two-component epoxy adhesives where the two reaction components are only mixed just before application, curing then taking place at room temperature or moderately elevated temperature. The second reaction component may be selected from the reaction components known per se for two-component epoxy adhesives, for example di- or polyamines, amino-terminated polyalkylene glycols (for example Jeffamine, Amino-Poly-THF) or polyaminoamides. Other reactants may be mercaptofunctional prepolymers such as, for example, the liquid Thiokol polymers. Basically, the epoxy compositions according to the invention may also be cured with carboxylic anhydrides as the second reaction component in two-component adhesive formulations.

Besides the applicants mentioned at the beginning, the adhesive compositions according to the invention may also be used as potting compounds in the electrical or electronics industries and as die-attach adhesives in electronics for bonding components to circuit boards. Other possible applications for the compositions according to the invention are as matrix materials for composite materials such as, for example, fiber-reinforced composites.

However, a most particularly preferred application for the adhesives according to the invention is structural bonding in vehicle construction.

The quantity ratios between the individual components may vary within relatively wide limits, depending on the requirements the adhesive is expected to satisfy in regard to its application properties, flexibility, impact peel strength or tensile strength. Typical ranges for the key components are:

component A) 5–25% by weight, preferably 6–20% by weight component B): 5–30% by weight, preferably 5–20% by weight component C): 10–60% by weight, preferably 15–50% by weight; this component may be composed of one or more liquid and/or solid epoxy resins in which case it may optionally contain low molecular weight epoxides as reactive diluents fillers: 10–40% by weight hardener component (for heart-curable one-component systems): 1–10% by weight, preferably 3–8% by weight accelerator: 0.01–3% by weight, preferably 0.1 to 0.8% by weight rheology aid (thixotropicizing agent): 0.5–5% by weight.

As mentioned at the beginning, the requirements modern structural adhesives are expected to meet in vehicle construction continue to increase because more and more structural elements—including those with load-bearing functions—are being joined by bonding processes. As already stated in the article by G. Lötting and S. Singh entitled: "Anforderungen an Klebostoffe für Strukturverbindungen im Karosseriebau" Adhesion 1988, No. 9, pages 19 to 26, the adhesives are expected on the one hand to fulfill production aspects of practical relevance, including automatable application in short cycle times, adhesion to oil-covered metal panels, adhesion to various types of metal panels and compatibility with the process conditions on the paint line (resistance to washing and phosphating baths, curability during stoving of the CED primer, resistance to the following painting and drying operations). In addition, modern structural adhesives have to exhibit improving strength and deformation properties, even in the cured state. These include the high corrosion resistance and flexural strength of the structural components and the deformability of the bond under mechanical stress. High deformability of the structural components guarantees a considerable safety advantage in the event of a crash. This crash behavior can best be determined by determining the impact energy for cured bonds; sufficiently high values for impact energy or impact/peel energy are desirable both at high temperatures of up to +90° C. and in particular at low temperatures down to −40° C. High tensile shear strength should also be achieved. Both strengths should be achieved on a large number of substrates, mainly oil-covered metal panels, for example steel bodywork panels, steel plate galvanized by various methods, panels of various aluminium alloys or even magnesium alloys and steel plates coated by coil coating with organic coatings of the "Bonazinc" or "Granocoat" type. As shown in the following Examples, the adhesive compositions according to the invention surprisingly satisfy these requirements to a very high degree.

The following Examples are intended to illustrate the invention. All quantities in connection with the compositions are parts by weight, unless otherwise indicated.

General Procedure for Producing Component A)

A carboxy-terminated poly(butadiene-co-acrylonitrile) (Hycar CTBN 1300×13) was reacted for 3 hours with stirring under nitrogen at 140° C. with an approximately 10-molar excess of a liquid DGEBA epoxy resin until the reaction was constant.

General Procedure for Preparing Reaction Product B)

About 1.85 equivalents of the diisocyanate were introduced under nitrogen at 120° C. into a stirred, heatable tank reactor, after which one equivalent of the polyol was added dropwise at 120° C. and the reaction was continued for 3 hours at 120° C. The isocyanate-terminated polyurethane prepolymer formed was then reacted with a stoichiometric excess of polyphenol, the polyphenol being quickly added to the reaction mixture. The reaction was continued for another hour an 120° C., after which a liquid polyester polyol was added to the reaction mixture. The mixture obtained was used for the production of the adhesive.

General Production of the Adhesive

In a kneader, components A), B) and a liquid epoxy resin and a solid epoxy resin were mixed to homogeneity at room temperature or optionally at 80° C. in the presence of the fillers, hardeners, accelerators and rheology aids and the resulting mixture was poured into the storage containers optionally while still warm.

EXAMPLE 1

Component B) was prepared from 66.3 parts by weight of Poly-THF-2000 (a product of BASF), 10.3 parts by weight of hexamethylene diisocyanate, 8.4 parts by weight of resorcinol and 15.0 parts by weight of Dynacol 7250 (a product of Hüls) by the general procedure for preparing reaction product B).

Component A) was prepared from Hycar CTBN 1300×13 and a liquid DGBEA resin by the method described above. The resulting composition contained 40% butyl rubber and had an epoxy equivalent weight of 900 and a viscosity of 80° C. of 200 Pa.s.

EXAMPLES 2–3

Adhesive compositions according to the invention were prepared from components B) of Example 1, component A) and a liquid DGEBA resin (epoxy equivalent weight 189), fillers, dicyanodiamide as hardener and accelerators and hydrophobic silica as thixotropicizing agent and optionally the thermoplastic polymer powder. The compositions are set out in Table 1.

TABLE 2

Adhesives according to the invention

| Example | 2 | 3 |
|---|---|---|
| Component B) of Example 1 | 17.5 | 17.5 |
| Component A) | 6.5 | 6.5 |
| DGEBA resin, liquid | 49.6 | 49.5 |
| Wollastonite | 17.5 | 14.5 |
| Dicyanodiamide | 5.5 | 5.5 |
| Fenuron | 0.3 | |
| Imidazole/DGEBA adduct | | 0.5 |
| Polyvinyl butyral | | 3.0 |
| Silica, hydrophobic | 3.0 | 3.0 |

Wollastonite filler
Silica: Carbosil TS 720 (Cabot)

The adhesive properties of the Examples according to the invention and the adhesive properties of known adhesives are compared in Table 2. The adhesive of Comparison Example 1 was Betamate 1044/3 of Gurit Essex. It is assumed that this adhesive had been produced in accordance with the teaching of EP-A-0 308 664.

TABLE 2

Adhesive properties

| Example | 2 | 3 | Comparison 1 |
|---|---|---|---|
| Impact −40° C.[J] | 13.1 | 9.6 | 3.3 |
| Impact −20° C.[J] | 16.5 | 11.5 | 2.6 |
| Impact 0° C.[J] | 19.6 | 13.7 | 4.4 |
| Impact RT[J] | 21.8 | 14.4 | 5.2 |
| Impact 50° C.[J] | 22.7 | 16.9 | 5.7 |
| Impact 90° C. | 21.5 | 18.2 | 7.0 |
| TSS −40° C.[Mpa] | 40.8 | 40.4 | 18.9 |
| TSS RT[Mpa] | 29.5 | 29.4 | 16.6 |
| TSS +90° C.[Mpa] | 18.3 | 16.5 | 13.2 |
| 500 h SST | 27.8 | 24.4 | 15.2 |
| 1000 h SST | 26.9 | 23.4 | 13.3 |

Impact impact peel test to ISO 11343 at 2 m/sec
RT room temperature
TSS tensile shear strength to DIN 53283 on 1.5 mm thick 1403 steel
SST salt spray test to DIN 50021
cohesive fracture pattern 100% unless otherwise indicated As these test results show, the impact peel energy to ISO 11343 of the adhesives according to the invention is several times higher than that of the known adhesives. At very low temperatures in particular, the impact peel energy of the adhesives according to the invention is clearly better than that of the known adhesives without any deterioration in tensile shear strength of ageing behaviour in the salt spray test.

I claim:

1. A structural adhesive composition with good low temperature impact strength which comprises:

A) A copolymer having at least one glass transition temperature of −30° C. or lower and epoxy-reactive groups or a reaction product of this copolymer with a polyepoxide;

B) A reaction product of a polyurethane prepolymer with a polyphenol or aminophenol;

C) At least one epoxy resin;

D) A hardener and optionally a hardening accelerator;

E) Optionally at least one member selected from the group consisting of plasticizers, reactive diluents, rheology aids, fillers, wetting agents, antiagers and stabilizers;

F) At least one polyester polyol with a molecular weight of 400 to 5,000; and

G) Optionally a thermoplastic polymer powder.

2. The composition claimed in claim 1, wherein component A) comprises a butadiene-based copolymer.

3. The composition claimed in claim 2, wherein the copolymer of component A) comprises a carboxyl-containing copolymer based on at least one member selected from the group consisting of butadiene/acrylonitrile copolymer, butadiene/(meth)acrylate copolymer, butadiene/acrylonitrile/styrene copolymer and butadiene/(meth)acrylate/styrene copolymer.

4. The composition claimed in claim 1, wherein the copolymer of component A) comprises a core/shell polymer of which the core polymer is a diene polymer or a (meth)acrylate polymer with a glass transition temperature of –30° C. or lower and which may optionally be crosslinked with 0.01 to 5% by weight of a diolefinic comonomer and of which the shell polymer has a glass transition temperature of 60° C. or higher and contains residues of at least one monomer selected from the group consisting of alkyl (meth)acrylate, (meth)acrylonitrile, (methyl) styrene, olefinically unsaturated carboxylic acids, olefinically unsaturated carboxylic anhydrides and mixtures thereof.

5. The composition claimed in claim 1 wherein component A comprises an adduct of an epoxy resin and a butadiene based copolymer.

6. The composition claimed in claim 1 wherein component B) comprises a compound of the formula:

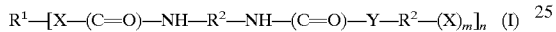

in which m=1 or 2, n=2 or 3, $R^1$ is a residue of a polyalkylene glycol after removal of the functional groups (hydroxyl or amino groups), $R^2$ is $C_{6-18}$ alkyl, aryl, aralkyl (residue of a diisocyanate after removal of the isocyanate groups), X, Y is —O—, —S— or —NR$^4$—, where R$^4$=H or $C_{1-4}$ alkyl or phenyl, $R^3$ is a carbocyclic-aromatic or araliphatic m+1-functional residue with groups Z directly attached to an aromatic ring and Z is —OH or —NHR$^4$ (residue of a polyphenol or aminophenol after removal of the functional groups).

7. The composition claimed in claim 1, wherein component B) is dissolved in a liquid polyepoxide.

8. The composition claimed in claim 1, wherein component B) is reacted with a stoichiometric excess of a polyepoxide.

9. The composition claimed in claim 1 wherein

D) comprises a latent hardener selected from the group consisting of dicyanodiamide, guanamines, guanidines, aminoguanidines, solid aromatic diamines and mixtures thereof and optionally a hardening accelerator.

10. A cured composition of claim 1 having an impact peel energy of at least 5 J at –20° C. (to ISO 11343).

11. The production of composite materials, potting compounds in the electrical and electronics industries and die-attach adhesive for the production of circuit boards in the electronics industry wherein the adhesive comprises the composition of claim 10.

12. The method for hardening a composition of claim 1 which comprises heating the composition to a temperature of 80° C. to 210° C.

13. A method for bonding substrates selected from the group consisting of metallic materials composite materials and combinations thereof comprising:

1) applying an adhesive composition comprising:
   A) 5% to 25% by weight of the adhesive composition of a copolymer with at least one glass transition temperature of –30° C. or lower and groups reactive with epoxy resins or a reaction product of the copolymer with a polyepoxide in stoichiometric excess;
   B) 5% to 30% by weight of adhesive composition of a product of the reaction of a polyurethane prepolymer with a polyphenol or an aminophenol;
   C) 10% to 60% by weight of the adhesive composition of an epoxy resin, wherein the epoxy resin comprises a mixture of liquid and optionally solid epoxy resins and optionally low molecular weight epoxy resins as reactive diluents;
   D) 1% to 10% by weight of the adhesive composition of a hardener, to one of the surfaces of a substrate to be joined, optionally after at least one of cleaning and surface treatment;

2) fitting the substrates to be joined together;

3) optionally pregelling the adhesive composition; and 4) curing the adhesive composition by heating the substrates to a temperature of from 80° C. to 210° C.; whereby, a joint with a lap shear strength at room temperature of at least 15 Mpa and a lap shear strength at 90° C. greater than 10 Mpa, when the substrates are steel, is formed, and wherein a low temperature impact resistance measured according to ISO 11343 at –20° C. as impact peel energy is at least 5J at 2 m/sec. and wherein B) comprises residues of at least one of hydroxy or amino terminated polytetramethylene glycols.

14. The method of claim 15 wherein the adhesive composition is cured at a temperature of from 120° C. to 180° C.

15. The method of claim 12 wherein the composition is heated at a temperature of from 120° C. to 180° C.

16. The method of claim 13 wherein the adhesive composition further comprises:

D) a latent hardener selected from the group consisting of dicyanodiamide, guanamines, guanidines, aminoguanidines, solid aromatic diamines and mixtures thereof and optionally a hardening accelerator;

E) optionally at least one further member selected from the group consisting of plasticizers, reactive diluents, rheological auxiliaries, fillers, wetting agents, antiagers and mixtures thereof;

F) a polyesterpolyol with a molecular weight of from 400 to 5,000; and

G) optionally a thermoplastic polymer powder.

17. The method of claim 13 wherein B) comprises a compound of the formula:

18. The structural adhesive composition of claim 1; wherein,

A) comprises from 5% to 25% by weight of the composition;

B) comprises 5% to 30% by weight of the composition;

C) comprises 10% to 60% by weight of composition; and

D) comprises 1% to 10% by weight of the composition.

* * * * *